(Model.)
J. HESCH.
APPARATUS FOR BOILING ACIDS AND CHEMICALS.
No. 275,041. Patented Apr. 3, 1883.
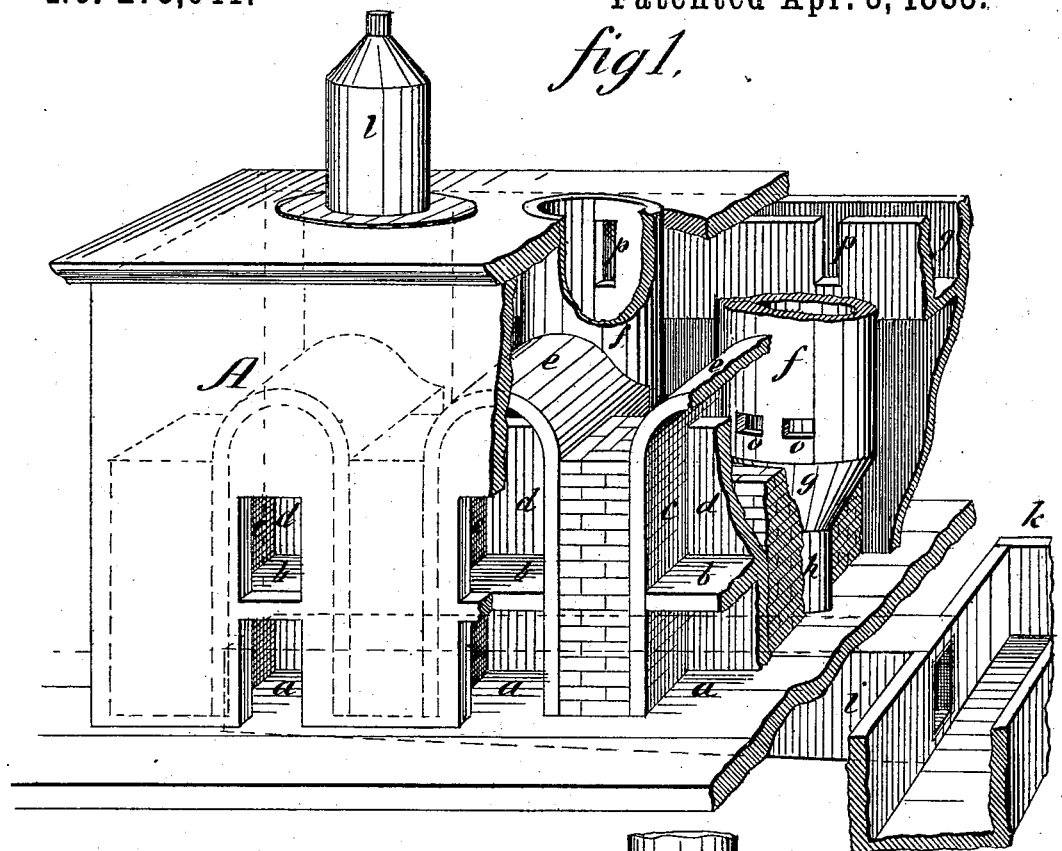
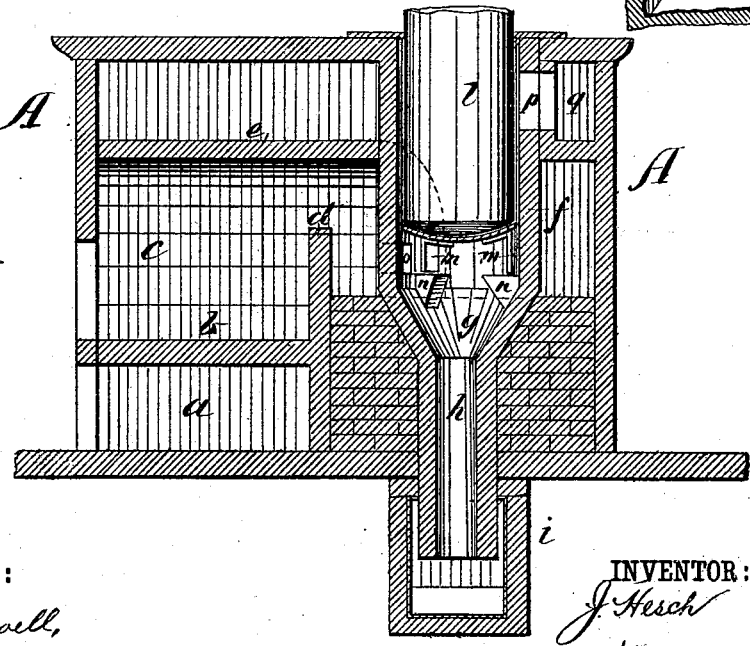

UNITED STATES PATENT OFFICE.

JACOB HESCH, OF TITUSVILLE, PENNSYLVANIA.

APPARATUS FOR BOILING ACIDS AND CHEMICALS.

SPECIFICATION forming part of Letters Patent No. 275,041, dated April 3, 1883.

Application filed October 21, 1882. (Model.)

*To all whom it may concern:*

Be it known that I, JACOB HESCH, of Titusville, in the county of Crawford and State of Pennsylvania, have invented a new and Improved Apparatus for Boiling Acids and Chemicals, of which the following is a full, clear, and exact description.

My improvements relate to benches of glass retorts for use in restoring spent acids or any chemicals that are boiled in glass retorts.

The object of the invention is to prevent the rupture of the glass retorts or other parts of the apparatus by heating, and the consequent waste of acids and danger to the attendants. Further, the object is to obtain a more economical application of the heat, specially when the full bench of retorts is not in use.

Reference is to be had to the accompanying drawings, forming a part of this specification, in which similar letters of reference indicate corresponding parts in both the figures.

Figure 1 is a sectional perspective view of a bench of three retorts constructed in accordance with my invention. Fig. 2 is a transverse section of the same.

A A are the outer or main walls.

$a$ $a$ are the ash-boxes. $b$ $b$ are the fire-boxes, which are separated by transverse partitions $c$; and $d$ are bridge-walls at the back part of the fire-boxes, separating them from the space at the rear which contains the retorts. The fire-boxes $b$ are constructed of fire-brick, and the bridge-walls $d$ are constructed in their lower portions of brick, the upper portion being formed by fire-brick tiling, which is securely anchored in the walls at the sides of the fire-boxes.

$e$ are arches covering the fire-boxes, which are also made of fire-brick, and the spaces between the several arches, fire-boxes, and ash-boxes are filled in with solid brick masonry.

In the space behind the brick walls $d$ are chambers $f$, formed by circular walls of brick, which open through the top of the apparatus, and are formed at their lower ends with funnel-shaped portions $g$, which terminate in pipes $h$, which are preferably ordinary sewer-tiling. The space around the funnels $g$ and pipes $h$ is to be filled in with solid masonry.

Beneath the bench is a sewer, $i$, constructed of brick lined with lead and covered by a cast-iron plate. It is also constructed at an inclination, so as to give a fall to its bottom to insure the discharge of any pieces, glass, sand, sediment, or material which might block the sewer. The top of the sewer will be level, and the inclination be made at its under side and proportioned to the number of retorts to the bench, so that it gradually increases in size.

A suitable reservoir, $k$, will be provided in connection with the sewer for maintaining a certain quantity of acid in the sewer, and the top of the sewer should be far enough below the floor of the building to allow of the reservoir being covered.

$l$ $l$ represent glass retorts of the usual construction contained within the circular chambers $f$ and resting on the saucers $m$, which are made of cast-iron and sustained by supports $n$.

The circular walls $f$ are made with openings $o$, connecting with the space behind the bridge-walls $d$, and they are also provided with openings $p$, connecting with a flue, $q$, that is common to all the fire-boxes.

The bridge-wall $d$, being made of solid fire-brick tiling running into the side wall of the fire-boxes, is strong and durable, and is not liable to give way from the heat. All danger to the workmen in such giving way of the bridge-wall is thus avoided, as well as the escape of acid into the fire and ash boxes, which is not only a waste of acid, but in time destroys the bench. The several fire-boxes and retort-spaces in the bench being separated, there is no communication whatever from one to the other. One or more retorts in the bench may be used without waste heat; and, furthermore, as the pipes $h$ project downward into the sewer and the sewer is to be filled with acid sufficiently to cover the lower ends of these pipes, there can be no communication between one retort-space and another through the sewer, and all cold air is prevented from passing from the sewer into the retort-space. The sewer, being also lined with lead, cannot be destroyed by the acid. The sewer may also be made use of for cooling the retorts, which is accomplished by removing the acids from the reservoir, so as to allow the cold air to pass in by the pipes $h$ to the spaces around the retorts.

Having thus fully described my invention, I claim as new and desire to secure by Letters Patent—

1. A retort-chamber, $f$, formed of circular walls extending through the top of the apparatus and having supports n for the saucers, whereby the saucers and retorts may be set in place, as described.

2. The combination, with a reservoir, k, and sewer i, arranged as described, of one or more retort-chambers, tapered at the lower part and terminating in pipe h, extended down into said sewer, as and for the purpose described.

3. The combination and arrangement of the retort-chambers f, funnels g, pipes, h, supports n, and sewer i, substantially as shown and described.

JACOB HESCH.

Witnesses:
FRANK TACKY,
JAMES LACHERMAIER.